United States Patent
Tooley et al.

(10) Patent No.: US 10,936,700 B2
(45) Date of Patent: Mar. 2, 2021

(54) METHOD AND SYSTEM FOR DETECTING PIRATED VIDEO NETWORK TRAFFIC

(71) Applicants: Matthew John Tooley, Fairfax, VA (US); William A Check, Great Falls, VA (US)

(72) Inventors: Matthew John Tooley, Fairfax, VA (US); William A Check, Great Falls, VA (US)

(*) Notice: Subject to any disclaimer, the term of this patent is extended or adjusted under 35 U.S.C. 154(b) by 225 days.

(21) Appl. No.: 16/381,571

(22) Filed: Apr. 11, 2019

(65) Prior Publication Data
US 2020/0110853 A1    Apr. 9, 2020

Related U.S. Application Data

(60) Provisional application No. 62/740,569, filed on Oct. 3, 2018.

(51) Int. Cl.
| | |
|---|---|
| *G06F 21/10* | (2013.01) |
| *G06N 20/00* | (2019.01) |
| *H04L 29/06* | (2006.01) |

(52) U.S. Cl.
CPC ............ *G06F 21/10* (2013.01); *G06N 20/00* (2019.01); *H04L 63/1408* (2013.01); *G06F 2221/0797* (2013.01)

(58) Field of Classification Search
CPC ........... G06F 21/10; G06F 2221/0797; G06F 21/16; H04L 63/1408; G06N 20/00
See application file for complete search history.

(56) References Cited

U.S. PATENT DOCUMENTS

| | | | | |
|---|---|---|---|---|
| 10,243,980 | B2* | 3/2019 | Vasseur | H04L 45/08 |
| 2006/0198313 | A1* | 9/2006 | Kitamura | H04L 43/00 |
| 2008/0262990 | A1* | 10/2008 | Kapoor | H04L 63/1408 |
| | | | | 706/20 |
| 2018/0131711 | A1* | 5/2018 | Chen | H04L 63/0236 |
| 2018/0247054 | A1* | 8/2018 | Porat | G06N 7/005 |
| 2019/0260787 | A1* | 8/2019 | Zou | H04L 41/142 |

OTHER PUBLICATIONS

Palmieri et al, "On the detection of card-sharing traffic through wavelet analysis and Support Vector Machines", Sep. 13, 2012, Applied Soft Computing 13, pp. 615-627.*

* cited by examiner

*Primary Examiner* — Christopher A Revak

(57) ABSTRACT

A pirated video identification system for network operators to detect and identify both encrypted and unencrypted Internet protocol (IP) pirated video. The system uses ground truth data gathered from various video player clients as input to train a machine learning that then is used to analyze both real-time and historical IP flow data from a network to identify the IP addresses of both the source and destination of pirate video traffic on the network. They system can be used to aid in accurately measuring the volume and scale of pirated video traffic on a network as well as aiding in taking countermeasures against both the distributors and consumers of the pirated video.

18 Claims, 14 Drawing Sheets

METHOD AND SYSTEM FOR DETECTING PIRATED VIDEO NETWORK TRAFFIC

BACKGROUND OF THE INVENTION

The present invention is in the technical field of data communications network engineering. More particularly, the present invention is in the field of network management for detecting the transfer, without the permission of the copyright holder, of illicit "pirated" video over the Internet, independent of whether the data traffic is encrypted or unencrypted.

The current state of the art for detecting pirated video traffic relies upon some combination of a priori knowledge of the sources and the use of deep packet inspection (DPI), video watermarking, and/or social engineering based on unencrypted traffic. It would be desirable to have a solution that could do this without needing a priori knowledge, DPI, and/or watermarking and that the solution would work with either encrypted or unencrypted traffic.

The term "pirated video" refers to videos that are either made available for download or streaming without the express permission of the copyright holder. Streaming video refers to downloading the video as a series of small file transfers.

SUMMARY OF THE INVENTION

The present invention addresses detection and identification of pirated video being transferred over networks connected to the Internet using either encrypted or unencrypted traffic. The present invention is a method and system for detecting illegal transfer of video files or illegal video streaming over the Internet. Video streaming without the permission of the copyright holder is an example of an illegal transmission and is commonly referred to as pirating, and in this document may be also referred to as pirated video. The exemplary embodiments of the present invention describe a method, system, and apparatus for obtaining and using a ground truth data set to use as the training data as input to a computer system running a machine learning algorithm to generate a machine learning model, using both real-time and/or historical flow-level or flow and packet statistics as input to the computer system. Further, analysis is performed using the machine learning model to output a statistical prediction of plurality of data labels assigned to the input stream and categorized as pirated video traffic, transforming the categorized data to generate a list of video pirate source Internet Protocol (IP) addresses and client video player IP addresses for input to a network measurement system, transforming the categorized data for input to a network policy control system such as a Policy Charge Rules Function (PCRF) found in a wireless network or a policy server found in a DOCSIS cable network, transforming the categorized data for transfer to a separate processor for law enforcement intercept purposes, or transforming the categorized data for transfer to a network controller that controls the network's data plane to segregate the pirate video from other network traffic.

BRIEF DESCRIPTION OF THE DRAWINGS

Some embodiments of the present invention are illustrated by way of example, and not by way of limitation, in the figures of the accompanying drawings and in which like reference numerals refer to similar elements.

DETAILED DESCRIPTION OF THE INVENTION

Figure 1:
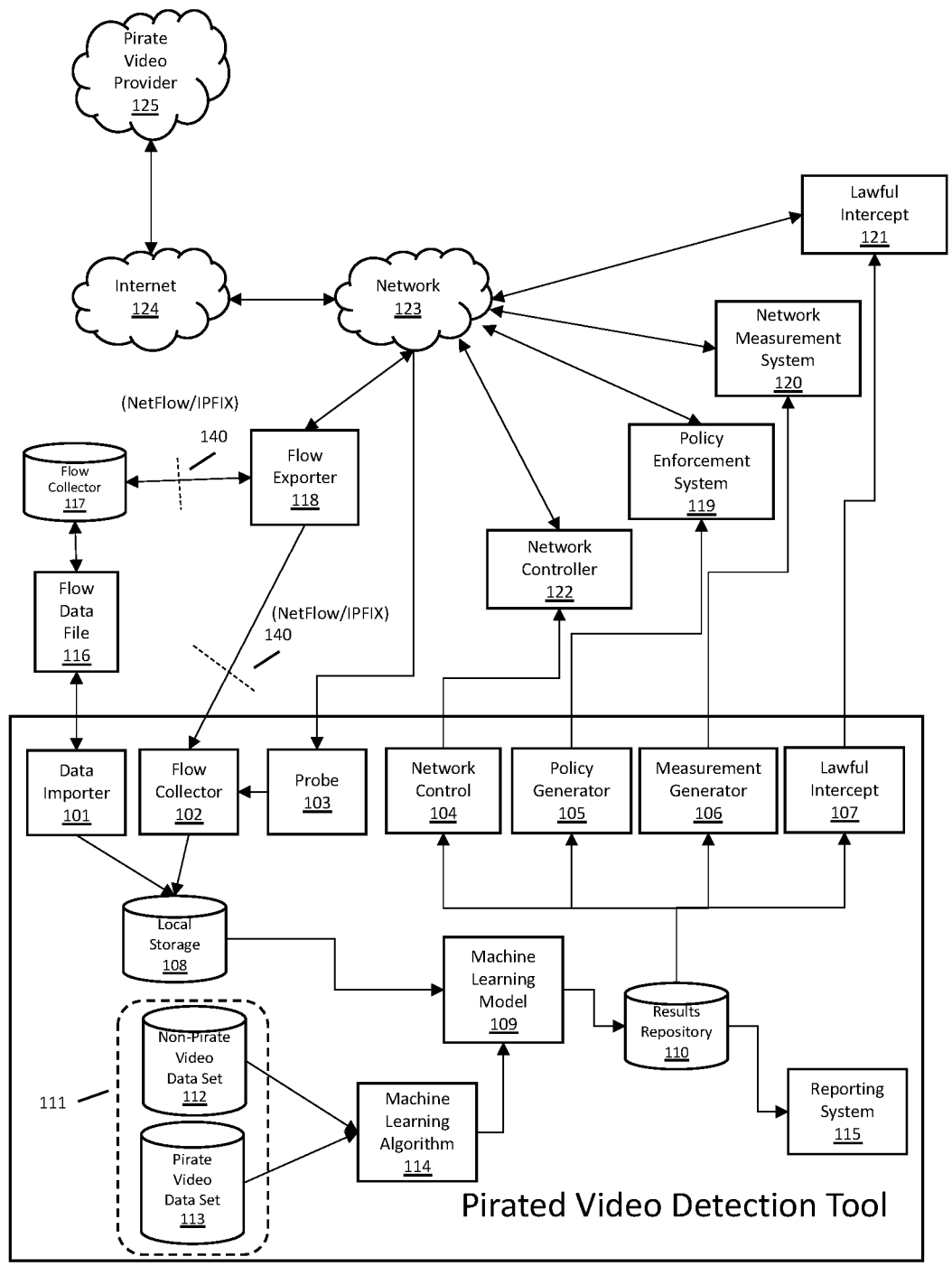
FIG. 1 is a partial block diagram of a system implementing the real-time and historical flow analysis to detect pirated video on the network in accordance with certain embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

In broad embodiment, the present invention is a method, system, and apparatus that uses input IP flow-level and packet statistics to a machine learning model for analysis to identify and predict the IP addresses from which the pirate video clients on the network are sourcing the video traffic and/or to identify the IP addresses of the client pirate video player IP addresses. The present invention does not require a priori knowledge of the IP addresses of the sources of pirated video, instead the present invention trains a machine learning model to find and label packet flows with attributes that match those in the training data set. The present invention then categorizes the labeled flow using the labeled statistical prediction and transforming the categorized list into a list of IP addresses on the network that are either sourcing pirated video traffic or consuming pirated video traffic. The list of IP addresses is used to generate instructions to other network management systems such as the network measurement system, the network policy control system, lawful intercept system, and the network controller of the network operator.

The present invention uses input flow-level and packet statistics for packets which may be encrypted or unencrypted. This permits the invention to detect and identify pirated video traffic that is transmitted using a VPN (Virtual Private Network) or other forms of encrypted or scrambled transmission.

Throughout this disclosure, the term "flow", "IP flow-data" and "flow-data" may be used interchangeably depending upon the context and refers to the logical connection between a pair of IP addresses and is consistent with the definition of "Flow" as described in Internet Engineering Task (IETF) Request for Comment (RFC) 7011, IPFIX Protocol Specification. In one or more embodiments, flows are categorized based on flow tuples or flow key as described in RFC 7011. For example, a flow-tuple may be in the format of <source IP address, destination IP address, source port, destination port, protocol>.

Given the dynamic nature of pirated video, embodiments of the present invention re-learn new machine learning models over time, utilizing continually updated ground truth data for training. In this regard, the machine model is retrained to keep pace with the changing nature of how pirated video is delivered.

The pirated video detection tool (100) may include one or more computer systems, which may be implemented as a server or any conventional computing system. However, those skilled in the art will appreciate that implementations of various technologies described herein may be practiced in other computer system configurations, including cloud-based servers, software defined networks, virtualized network nodes as part of network function virtualization architectures, multiprocessor systems, desktop computing systems, hand-held and mobile devices, network personal computers, mini-computers, mainframe computers, and the like.

FIG. 1 is a block diagram of the system implementing the Pirated Video Detection Tool (PVDT) (100) to statistically predict pirated video flows from either real-time or historical packet flow data. The block diagram shows a pirated video provider (125) connected to the Internet cloud (124) and a network operator's network (123) connected to the Internet cloud (124). Standard on many network routers and switches is a feature for exporting (118) IP flow data such as NetFlow and the Internet Engineering Task Force (IETF) IP Flow Information Export (IPFIX) standard. The network operator typically configures the flow exporter (118) to export flows to a flow collector (117) on its network as part of its network management system. In addition, network operators typically will have as part of the network management systems a policy enforcement system (119), a network measurement system (120), lawful intercept (121), and network controller (122). The policy enforcement system may be as simple as a network firewall or as sophisticated as a 3GPP policy control system that includes a 3GPP compatible Policy Charging Rules Function (PCRF) element in the network for dynamically managing the network. The network measurement system (120) typically is comprised of tools and technologies such as simple network management protocol based (SNMP) monitoring tools, IP flow collectors, and deep packet inspection for gathering of network measurements.

FIG. 1 includes the block diagram for the Pirated Video Detection Tool (100). The tool includes a data importer (101) for importing historical flow-data, a flow collector (102) for ingesting real-time flow-data, a probe (103) for monitoring network traffic, local storage (108) for buffering the flow-data, the trained machine learning model (109), a results repository (110), a ground truth repository (111) containing a non-pirate video or benign data set (112) and a pirate video data set of known pirate video data (113), a machine learning algorithm (114), a measurement generator (106), a policy generator (105), a lawful intercept policy generator (107), a network control policy generator (104) and a reporting system (115).

In one or more embodiments of the invention, the network controller (122), the policy enforcement system (119), the network measurement system (120), and lawful intercept system (121) are in the control plane of the network (123). Each has an application program interface to receive commands from other systems including the pirated video detection tool (100) and its subsystems (119, 120, 121, 122). Each system manages the data forwarding plane of the network (123) for its function.

In one or more embodiments of the invention, the network (123) has a flow exporter (118). The flow exporter (118) may be embedded in the routing and switching nodes of network (123) or it may be a standalone node in the network (123). The flow exporter (118) monitors the network traffic and generates flow records that include flow statistics that include flow start time, flow end time, IP addresses associated with the flow, IP source and destination port associated with the flow, number of bytes for the flow, number of packets for the flow, sizes of the packets in the flow, inter-packet timing for the packets in the flow, contents of the packet payload from the first packet of the flow, and transport layer security (TLS) information for the flow. In some embodiments of this invention the flow statistics are in one of the standard formats like NetFlow or IPFIX (140).

In one or more embodiments of the invention, the flow exporter (118) sends the flow records to a flow collector (102, 117). The flow collector (102,117) may be a standalone server (117) or it may be an embedded flow collector (102) in the pirated video detection tool (100). The embedded flow collector (102) saves the flow records to local storage for processing. The standalone flow collector (117) saves the collected flow records to a computer file or flow data file (116) that can be imported into the pirated video detection tool (100) by the data importer function (101). The data importer (101) reads file that contains flow records, and transforms them to the data schema used internally to save the flow record to local storage (108).

In one or more embodiments of this invention, the pirated video detection tool includes a probe (103). The probe (103) monitors network traffic from the network (123) and generates flow records that are sent to the embedded flow collector (102), that in turn are transformed by the flow collector (102) into the internal data schema used to store the data in the local storage (108).

In one or more embodiments, the pirated video detection tool (100) includes a machine learning algorithm (114) or statistical data analyzer, the ground truth repository (111) containing the non-pirated video data set (112) and the pirate video data set (113) to generate a machine learning model (109) that is then used to statistically predict or detect the flows in the real-time or with historical flow data from the network (123). The non-pirated video or benign data set (112) is comprised of flow data samples of network traffic that are known not to include any pirate video transactions and that include a broad set of flow samples representing Internet traffic. The pirate video data set (113) is comprised of flow data samples of network traffic for traffic that are known to be pirated video and labeled as pirated video.

In one or more embodiments, the machine learning algorithm (114) uses a Logistic Regression algorithm that labels all the flows with a statistical probability of matching data in the pirate video data set (113). The present invention is not limited to the use of machine learning with Logistic Regression, other embodiments may use other supervised machine learning algorithms such as Logistic Model Tree, Random Forest, and K-Nearest Neighbor. Alternatively, other statistical analysis tools and methodologies may be used.

In one or more embodiments, the reporting system (115) transforms results from the results repository into human readable reports. The reports are in both text-based formats and graphical format.

Figure 2:
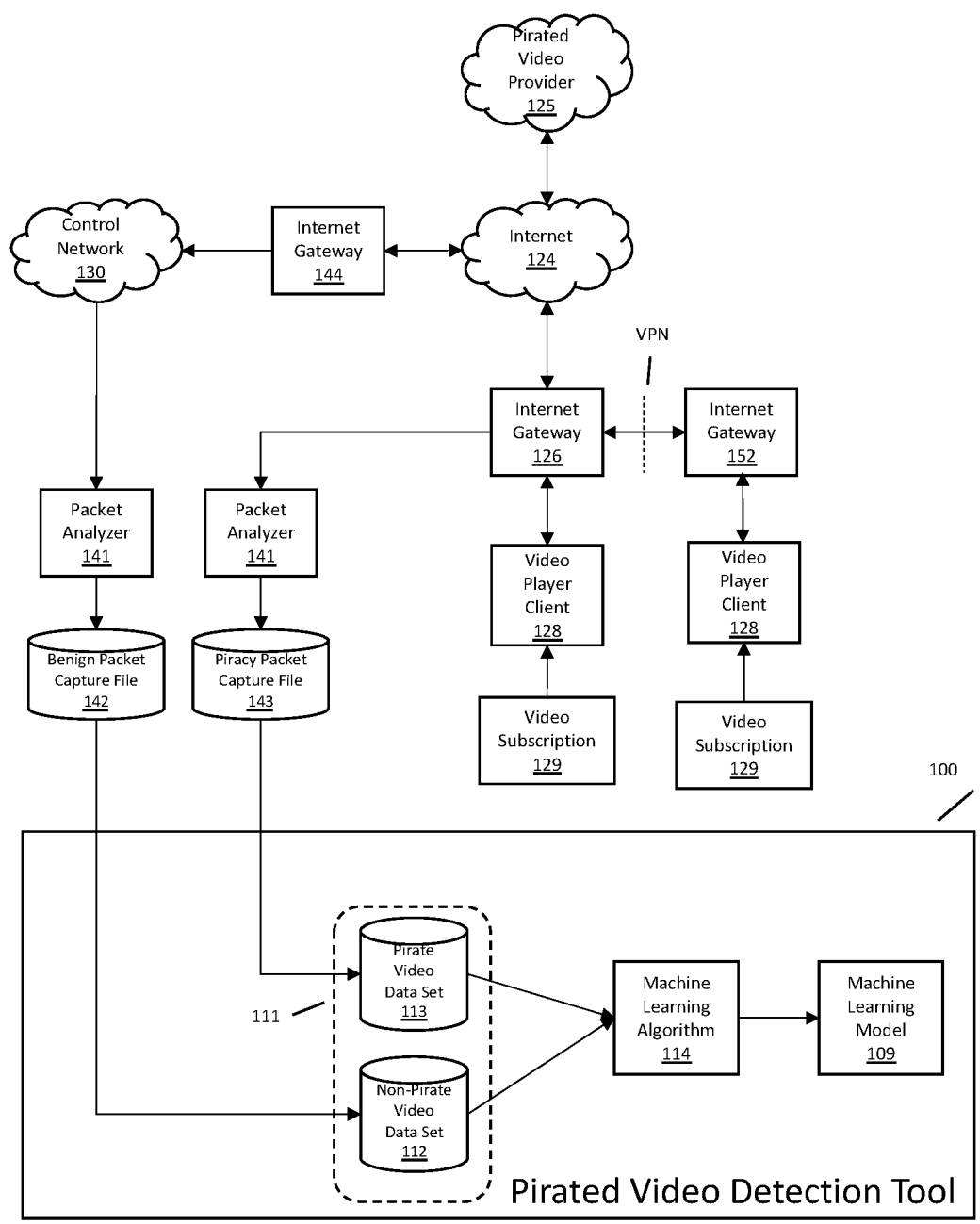
FIG. 2 is a partial block diagram of a system implementing the operation to capture IP flow data for pirate video and non-pirate video for the ground truth repository.

FIG. 2 shows the block diagram for obtaining ground truth data (111) used to train the machine learning model. The block diagram shows an over-the-top (OTT) video provider or pirated video provider (125) that is known to transfer videos without the permission of the copyright holder to video player clients (128). The transmission may be either as a file download or "streamed" as a download of a series of small data units that in their entirety comprise the video. The video service may require a subscription (129) and require the video player client (128) to identify itself to be authenticated and authorized to access the videos. The pirate video provider (125) is connected to the Internet (124). The video player client (128) is configured to access and play videos from the pirate video provider (125). This may require configuring the video player client (128) with any required video subscription credentials (129) to authenticate itself with the pirate video provider (125). The video player client (128) can be any of multiple forms including a software client that emulates an Internet Protocol television (IPTV) set top box, a hardware set top box, or software video client.

In one or more embodiments of the invention, a packet analyzer (141) is connected to interface on the internet gateway (126) that is configured to replicate or mirror all the traffic going to and from the video player client (128). The packet capture made by the packet analyzer is analyzed and flows that are unique to the transactions between the video player client (128) and the pirated video provider (125) are saved to the piracy packet capture file (143) and the file (143) is added to the pirate video data set (113).

In one or more embodiments, a packet analyzer (141) is connected to the control network (130) and saves the packet capture file as a benign packet file (142) which is added to the non-pirate video data set (112) The control network (130) is a network that is known not to have any end-points communicating with pirated video providers (125).

The pirate video data set (113) is comprised of flow data samples of pirate video transactions from known pirate video providers (125) for a plurality of video player clients (128). The samples are collected using the video player clients (128) connecting to the pirate video service providers (125) and performing a set of transactions such as downloading and/or streaming a video, booting the video player client (128), and authenticating the video player client content using the video subscription (129) credentials. Video player clients (128) include hardware-based devices such as IP-based set-top boxes or digital smart televisions running free or subscription video pirate software, hardware-based devices running ad-based video pirate software, or subscription pirate software. The video player clients (128) may be embedded as part of a dedicated playback device or may part of an application program such as an Internet browser. The samples are collected for video transactions both when the video player client (128) is connecting to the pirate video provider direct over the internet (124) and for when the video player client (128) is connecting to the pirate video provider (125). The samples are collected for both unencrypted and encrypted video player client (128) transactions with the pirate video servers (125). The unencrypted samples are collected using the video player client operating in its default mode or native mode. The video player client (128) may or may not use a form an encryption for its communications with the pirated video provider (125). The encrypted samples are collected by configuring the internet gateway (152) to use an embedded virtual private network client (VPN) to create a virtual private network between its wide area network (WAN) interface and a VPN server that is on the internet (124). The VPN client encapsulates and encrypt all the transmitted traffic and decapsulates and decrypts all the received traffic on its wide area networking (WAN). The virtual connection between the VPN client in internet gateway (152) and the VPN server in the internet (124) is often referred to as a "secure tunnel". The encrypted samples are collected after internet gateway (152) has established the secure tunnel and by performing the transactions between the video player client (128) and the pirated video provider (125).

The pirate video data set (113) and non-pirate video data set (112) are a collection of pre-processed flow data record files that together form the ground truth data repository (111) that are ready for analysis by the machine learning algorithm (114). This embodiment of the present invention uses an open-source machine learning library or a statistical library, but is not limited to using an open-source implementation of machine learning for both the machine learning algorithm (114) and the machine learning model (109), to implement a logistic regression algorithm that is trained with the flow-records from the pirated video data set (113) and non-pirate video data set (112) to generate the machine learning model (109) that is used for the real-time and off-line analysis of network traffic by the pirate video detection tool (100).

In one or more embodiments, the ground truth data is comprised of flow data samples of video traffic that have had the high-bandwidth digital content protection (HDCP) removed and been transcoded to an IP transmission format and uploaded to an internet-based storage system that have then been transmitted over the internet (124) for playback by a video player client (128) with the packets captured by a packet analyzer (141) and saved as a piracy packet file (143) to be added to the pirate video truth data set (113). For example, there are internet hosts that specialize in storing large files such as video files that can be shared with others.

Figure 3:
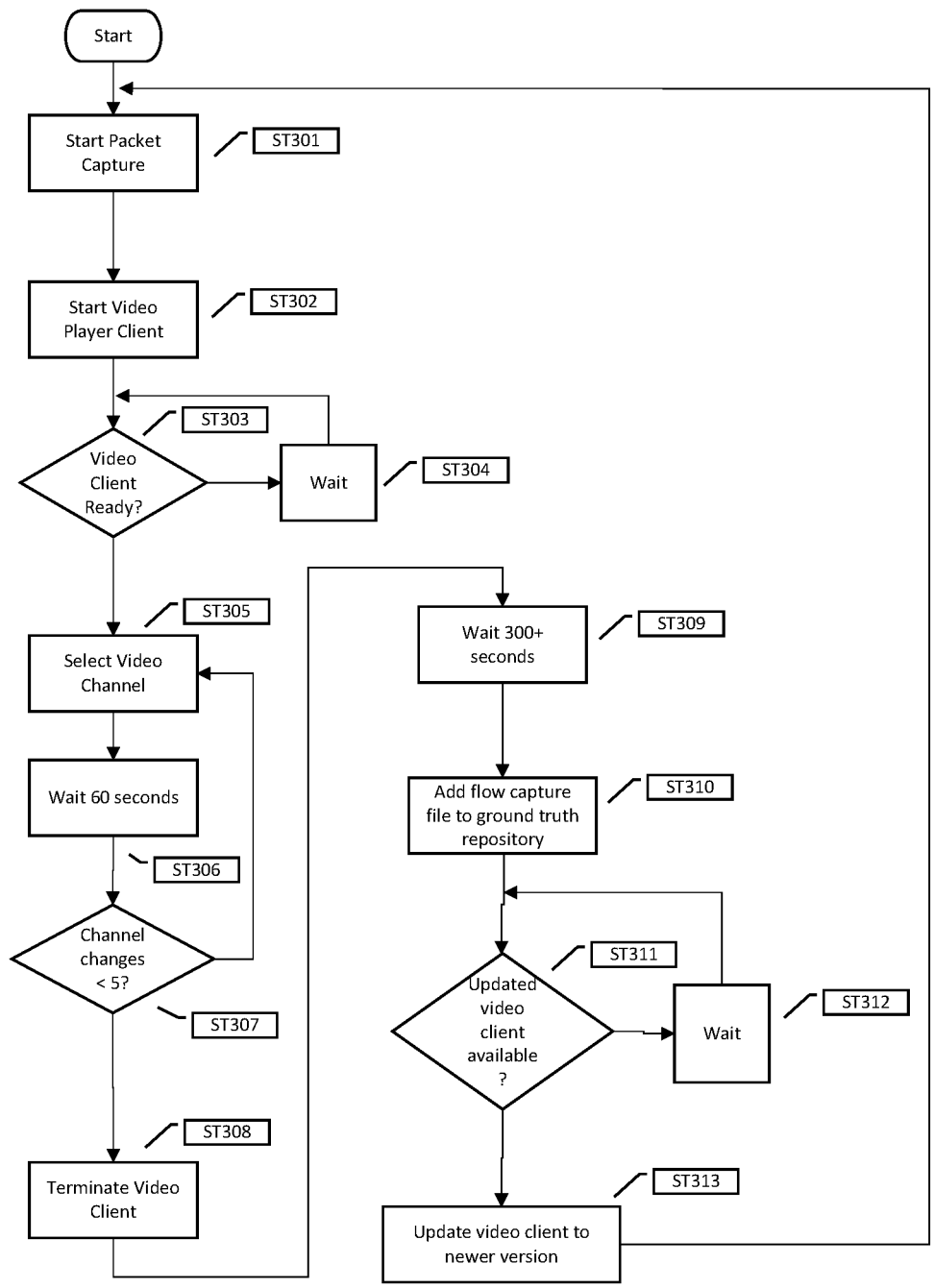
FIG. 3 shows a method flow chart according to aspects of the invention for capturing IP flow data for pirate video.

FIG. 3 shows the flow chart for the process of capturing pirated video IP flows for the ground truth repository (111). This process is repeated for each video player client (128) and each pirate video provider (125). The first step (ST301) is to start the packet capture with a packet analyzer (141). After starting the packet capture, the next step (ST302) is to start the video player client (128) and let it get to a ready state, step (ST303). After the video player client is ready (ST303/ST304), the next step (ST305) is to navigate through the menus and programming guide on the video player client to a channel and select a channel (ST305). After selecting the channel, the next step (ST306) is to let the video player client tune to the selected channel and then let the video play for a period of time, n seconds. In one or more embodiments of this invention the period of time is 60 seconds, but the time can be any period of time greater than zero. After n seconds, the next step (ST307) is to repeat this for five different channels. The next step (ST308) after selecting and viewing five different channels for n seconds is to terminate the video player client. In step (ST309), wait for the flows to all expire. In one or more embodiments of the invention the wait time is 300 seconds but is not limited to 300 seconds. The next step (ST310), is to stop the packet capture and save then copy the packet capture file to the ground truth repository (111, 113). The next step (ST311 & ST312) in the process is to periodically check for software updates to the video player clients. When a new version is available, step (ST313), to update the video player client and repeat the process by starting over again starting at step (ST301) for the respective client.

Figure 11:
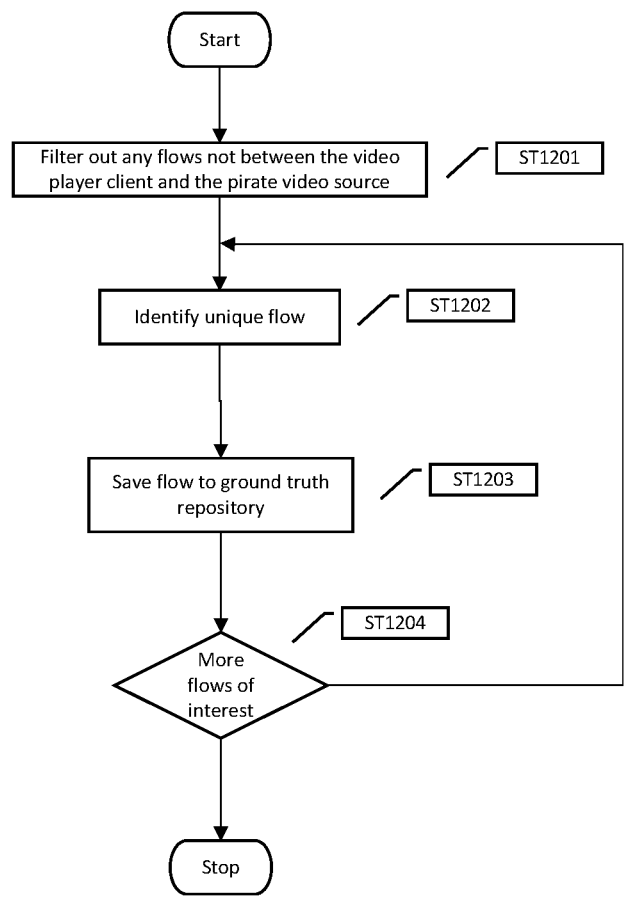
FIG. 11 shows the flow chart of an embodiment for the method to identify unique pirate video flows for the ground truth data set.

FIG. 11 shows the flow chart for operation to identify pirate video flows for the ground truth data set. After capturing the flows as described in FIG. 3, the next step (ST1201) is to analyze the pirate video packet capture files to filter out any packets that may have been erroneously captured that are not part of flows between the video player client and the pirate video service. In step (ST1202), the flows in the packet capture are analyzed to identify flows that are unique to the communications between the video player client and the pirate video service. Unique flows are analyzed through a manual inspection process of the packet capture looking for unique flows that include but are not limited to: 1) long-tail flows for the streamed video media, 2) authentication and authorization transaction between the video player client (128) and the pirated video provider (125), and 3) downloads for data objects such as the electronic programming guide, embedded video player, or software update to the video player client. After identifying a unique flow, the flow is saved to the ground truth repository in the next step (ST1203). The next step (ST1204) is checking the file again for additional flows and repeat this for all unique flows in the packet capture.

Figure 12:
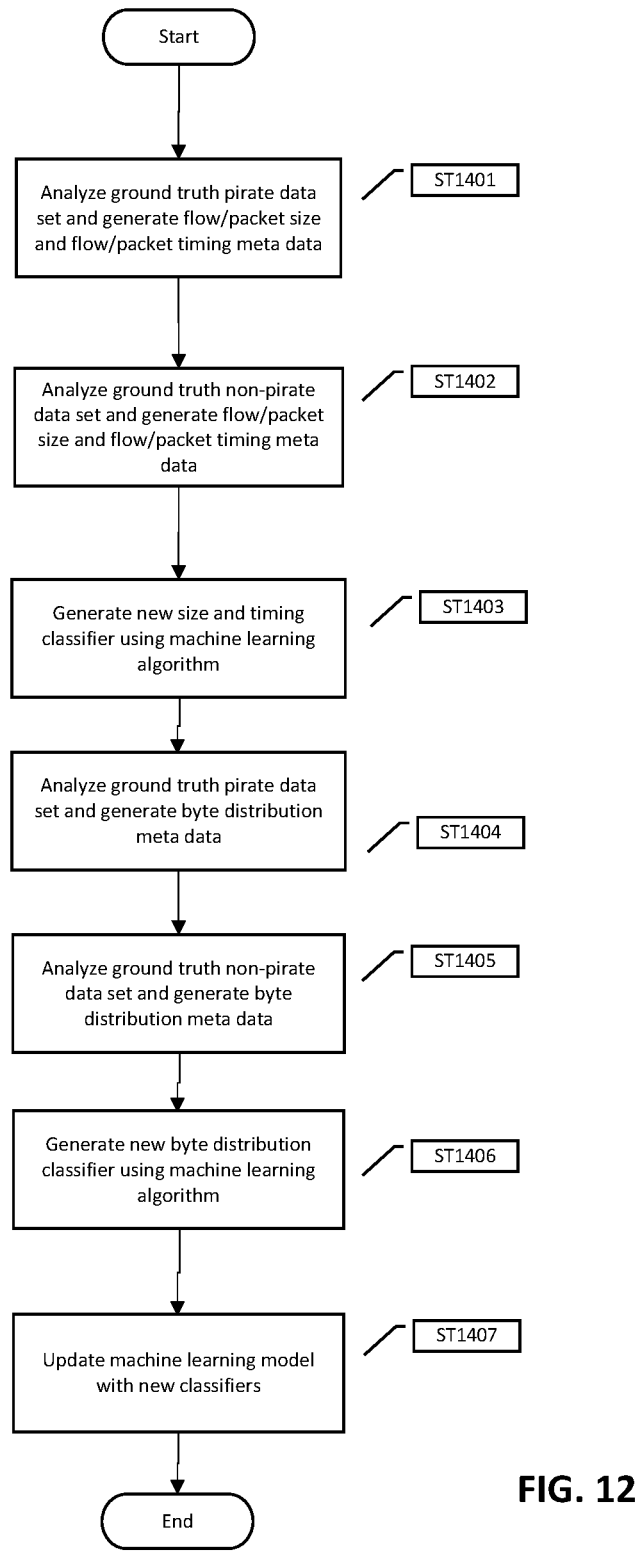
FIG. 12 shows a method flow chart of an embodiment to generate classifiers for the machine learning model.

FIG. 12 shows the flow chart for the operation to train the machine learning model. In one or more embodiments of the present invention, the machine learning model uses a pair of classifiers. The classifiers are either flow-based or packet based. One of the classifiers is based upon the sequence of packet or flow lengths and inter-packet/inter-flow times. For packet-based classifiers, the second classifier is based upon the distribution of the bytes within the data portion of the first packet in a flow where the byte distribution contains a count of the number of occurrences of each byte value and for flow-based classifiers the classifier is a null set. For embodiments of the invention where the IP flow data does not include the flow's first packet data field the byte distribution is null.

In one or more embodiments, in step (ST1401), the ground truth pirate flows are processed to generate a feature vector for each flow comprised of: 1) the IP flow meta data, 2) packet sizes for the flow, 3) inter-packet timing, 4) byte distribution of the first packet in the flow, and 5) TLS keys data for each pirate video flow in the ground truth data repository. The IP flow meta data for the feature vector is comprised of the source port, destination port, number of packets in each direction, number of bytes in each direction, start time, and end time for the flow. The packet sizes of the flow are comprised in the feature vector by the relative number of occurrences of packets sizes in a set of ranges occurs for the flow. The inter-packet timings of the flow are comprised in the feature vector as the relative number of occurrences for of the change in the inter-packet time from the previous packet to the current packet in the flow for a set of ranges. The byte distribution data is represented in the feature vector as relative number of times each byte value (e.g. 0-255) occurred in the flow data's byte data. The TLS key data in the feature vector is represented by an array of the TLS keys associated with the flow.

In step (ST1402), the process is repeated for each benign traffic flow in the ground truth data repository. The feature set is then processed in step (ST1403) by the machine learning algorithm to generate a new packet length and timing classifier for the model. The same process is repeated in steps (1404), (1405) and (1406) for the byte distribution feature set to generate a byte distribution classifier for the model. In step (1407), the new classifiers are then added to the machine learning model.

The processes outlined in FIG. 3, FIG. 11, and FIG. 12 are repeated for each category of video player clients. Each category of video player clients has a unique flow signature and is used to generate a pair of classifiers that is used to detect and identify its traffic in the network for further action. The term video player client is used here to describe both software and hardware clients that are used to retrieve videos. Video player clients include client-server clients, peer-to-peer clients, add-ons or extensions to applications that enable the retrieving of videos including agents such as agents that automate the login process video services (e.g. TVEverywhere).

Figure 13:
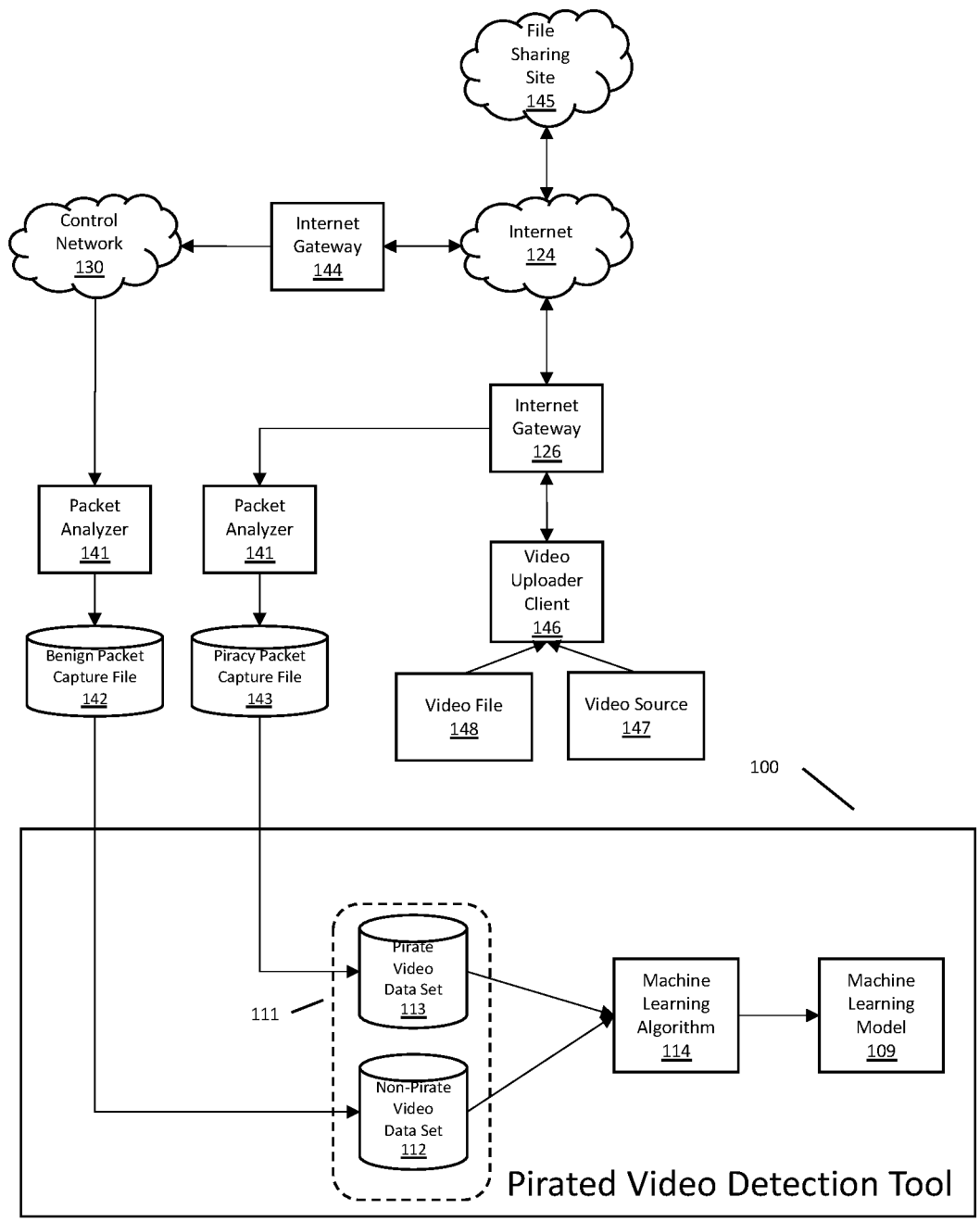
FIG. 13 shows the partial block diagram for the process to generate the machine learning model classifier for identifying and detecting the uploading or sharing of pirated video.

One or more embodiments of the invention process and analyze the flows from clients used to upload videos to file sharing sites. The processes outlined in FIG. 3, FIG. 11, and FIG. 12 are used to analyze the flow data for a client that is configured and performing a file upload. FIG. 13 shows the partial block diagram for the process to generate the machine learning model classifier for identifying and detecting the uploading or sharing of pirated video. The block diagram in FIG. 13 includes a file sharing site (145), a video uploader client (146), video file (148), and a video source (147). The file sharing site (145), sometimes referred to as a cyberlocker, is computer or an array of computers with storage systems that are connected to the Internet and used to share files. The video uploader client (146) is the client used to upload the file to the file sharing site. This may be a proprietary client associated with the site or the site may use standard client such as an FTP client. The video file (148) is file with data representing a video. The file does not have encryption, or any form of digital rights management encoded into the data. The video source (147) is a video capture device that converts a video signal that is encoded using one of the standard video formats, but not limited to, such as the one used by the High Definition Multimedia Interface (HDMI), composite video, or MPEG2 to storage that then can uploaded directly to the file sharing site (145).

As shown in FIG. 1, some embodiments of the invention described here will have the network operator's flow exporter (118) configured to relay the IP flow information to Pirated Video Prediction Tool's flow collector (102) to support online or real-time analysis and prediction. Other embodiments of the invention will have an interface that is functioning as a network probe (103) that monitors all the traffic on its interface to generate flow records that are forwarded to the flow collector (102) to support both online/real-time analysis. Other embodiments will export a trailing historical snapshot of flow data to a file (116) to be copied to the Pirated Video Prediction Tool (100) for offline analysis and prediction.

For online or real-time analysis, the flow data is streamed from the network operator's flow exporter (118) to the flow collector (102) or by the probe (103). The collected flow data is saved to local storage for processing and analysis by the machine learning.

Figure 6:
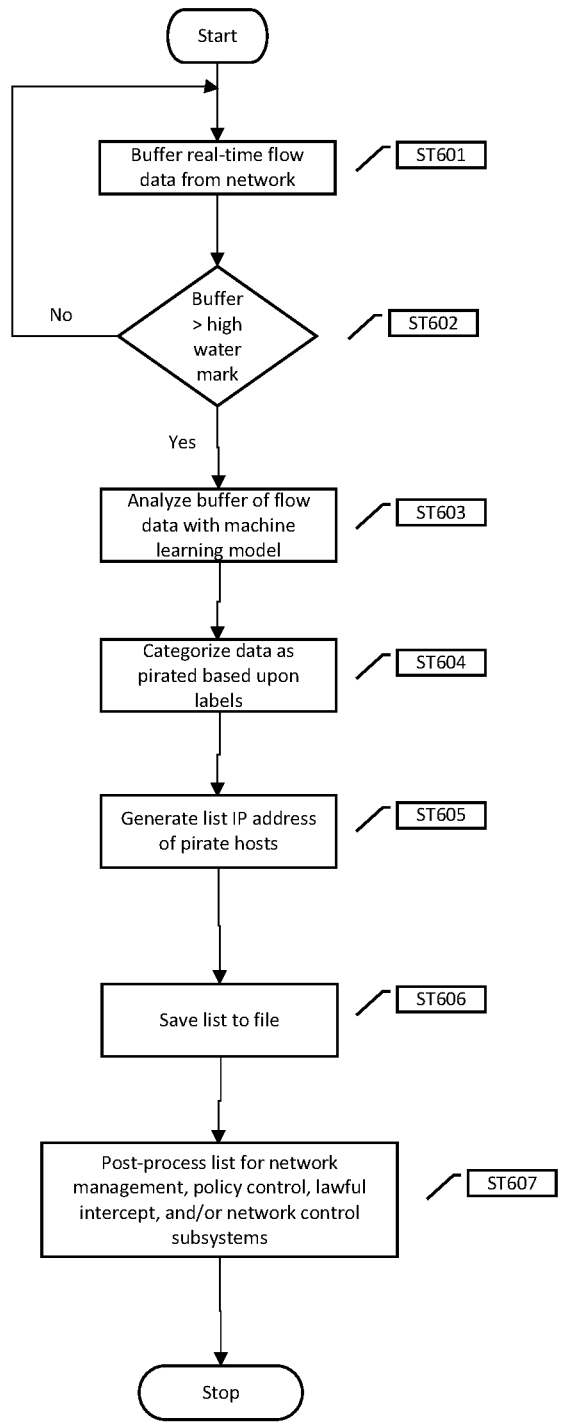
FIG. 6 shows a flow chart according to aspects of the invention for the operation of the invention when operating with real-time data.

FIG. 6 shows the flow chart for steps taken to analyze the real-time flow data. Start at step (ST601), the flow data is obtained by flow collector (102) where the flow data is buffered in the local storage (108). The next step, (ST602), is to wait until the input buffer has reached its high water mark after which the buffer of flow data is analyzed by the machine learning model (109) in step (ST603) where generates a feature vector for the flow and classifier generated earlier as part of the supervised learning process and labels the flow records with the statistical probability of the flow containing pirated video. The next step, (ST604), is to further categorize the labeled flow records by selecting only the records where the labeled probability is greater than a configured value. From the selected flows, in step (ST605) the flows are transformed into IP addresses and added to a list containing the IP addresses of the pirate hosts and end-points. Then in step, (ST606), the categorized flow records are then saved to the results repository (110). In step (ST607), the categorized results in the results repository are ready for post-processing. In some embodiments, the categorized results are transformed into a list of IP addresses for the network management system. In one or more embodiments of the invention the list of IP addresses may include the IP addresses from which pirated video is detected and identified, end-points that are receiving or consuming pirated video traffic, FIG. 4 describes those steps in more details.

Figure 14:
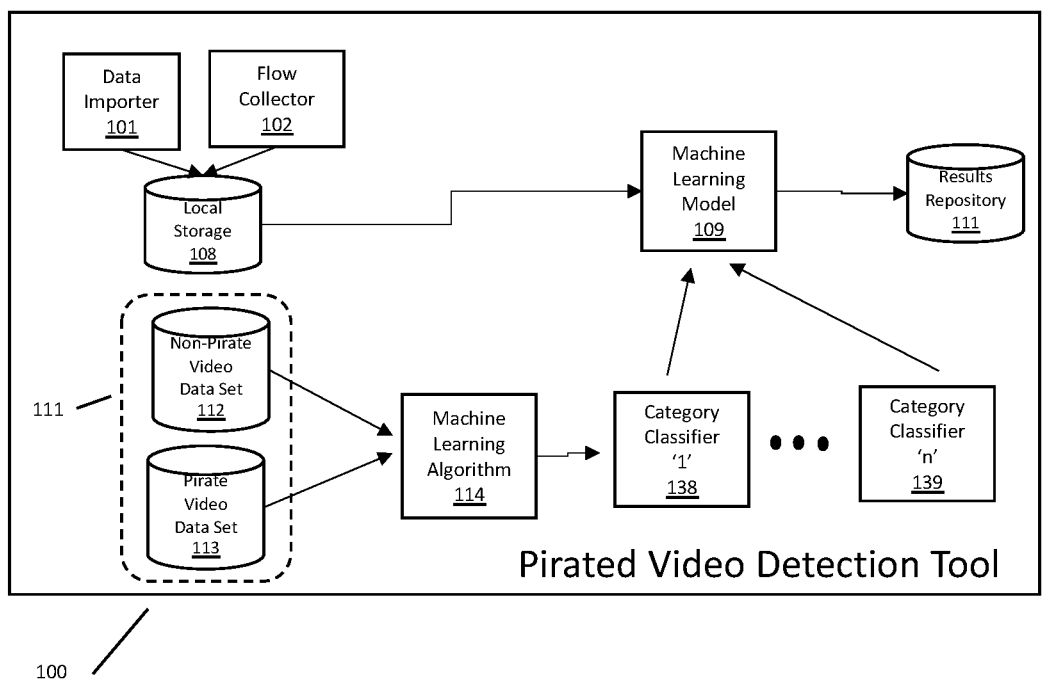
FIG. 14 is partially schematic block diagram of an embodiment implementing multiple classifiers for multiple categories of video player clients.

Some embodiments of the invention described here utilize multiple classifiers to generate a label for each category of video player client. FIG. 14 shows the partial block diagram of the invention with a plurality of classifiers. The IP flow data, real-time or historical, is processed by the machine learning model (109) with an array of the classifiers (138, 139). Each instance of machine learning model with its respective classifier labels the results with a label associated with the classifier and stores the results in the results repository (110). The machine learning models (109) with its respective classifiers may operate in parallel with each other or they may operate sequentially.

The video piracy distribution network is hierarchical. At the bottom of the hierarchy are multiple resellers and re-streamers who have their own control channel and who restream a common set of media channels. The common set of media channels come from wholesalers. Further up in the hierarchy is a set of content acquirers who provide the content to the wholesalers. In one or more embodiments of the invention, list of IP addresses is further post-processed in step (ST607) to identify the wholesalers and acquirers through an analysis of the relationships of the IP addresses to identify the set of IP addresses used for the media channels that are common to two or more of the resellers.

In one or more embodiments, the categorized results in the results repository (110) are transformed by the policy generator (105) into a message format compatible with the policy enforcement system such as the 3GPP Rx interface used to communicate with a 3GPP Policy Charging Rules Function (PCRF). In one or more embodiments the network's policy enforcement system (119) is configured to receive commands from the policy generator (105) to dynamically change the quality of service (e.g. speed, latency, jitter) and/or the accounting rules for measuring usage such as pirated video traffic on a per flow basis for a specific device attached to the network.

In one or more embodiments the network's measurement system (120) is configured to receive commands from the measurement generator (106) to modify the configuration of what is being measured on the network. The measurement generator (106) transforms the IP address list in the results repository (110) into a message format that is compatible with the network measurement system (120).

In one or more embodiments the network's lawful intercept (LI) system (121) is configured to receive commands from the pirate video detection tool (100) lawful intercept subsystem (107). The lawful intercept subsystem (107) searches the results repository (110) for the IP address of the end-user in question and all the IP address that were labeled as pirate IP addresses seen communicating with the IP address in question to generate a list of IP addresses to transform into a message format compatible with the lawful intercept system (121) which instructs the lawful intercept system as to which flows to monitor for illegal content.

Figure 10:
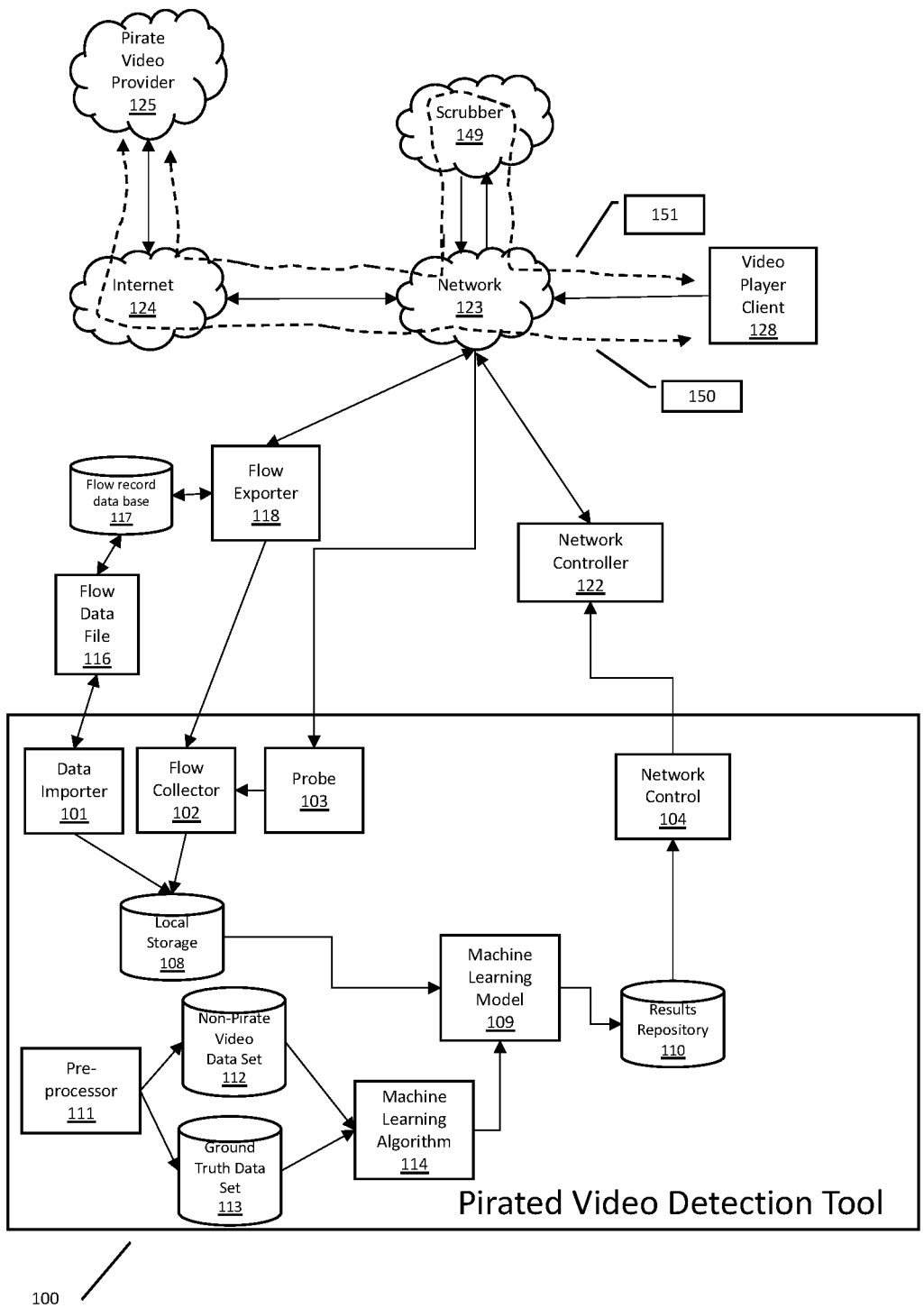
FIG. 10 shows a block diagram of an embodiment to dynamically segregate pirated video traffic from non-pirated video traffic on the network.

FIG. 10 is a partial block diagram of the system implementing segregation of piracy traffic on the operator's network. As the Pirated Video Detection Tool (100) detects and identifies the pirated traffic, this traffic can be routed on a separate path on the network for further analysis and action. The Pirated Video Detection Tool's (100) network control subsystem (104) interfaces to an external network controller (122). In some embodiments of the present invention, the network controller (122) is a software defined network (SDN) controller. The network controller (122) controls the network by sending commands to the network elements, layer 2 switches and layer 3 routers, instructing them on the network forwarding paths for groups of IP flows. As shown in FIG. 10, the network control subsystem (104) issues a command using one of the industry standard application controller plane interfaces (A-CPI) for each IP address identified as sourcing pirated video traffic to instruct the network to use network path (151) for any traffic to and from the video player client. All other traffic will continue to use network path (150). The Pirated Video Detection Tool (100) retains a list of the identified pirated video IP addresses in the network control subsystem (104) that get updated as new IP flows are detected. The entries in the list have a time to live value to age out the entries. When an entry in the table is aged out, the network control subsystem (104) issues a command to the network controller (122) instructing it to remove the associated IP address from the network path (151) for pirated video traffic.

Figure 5:
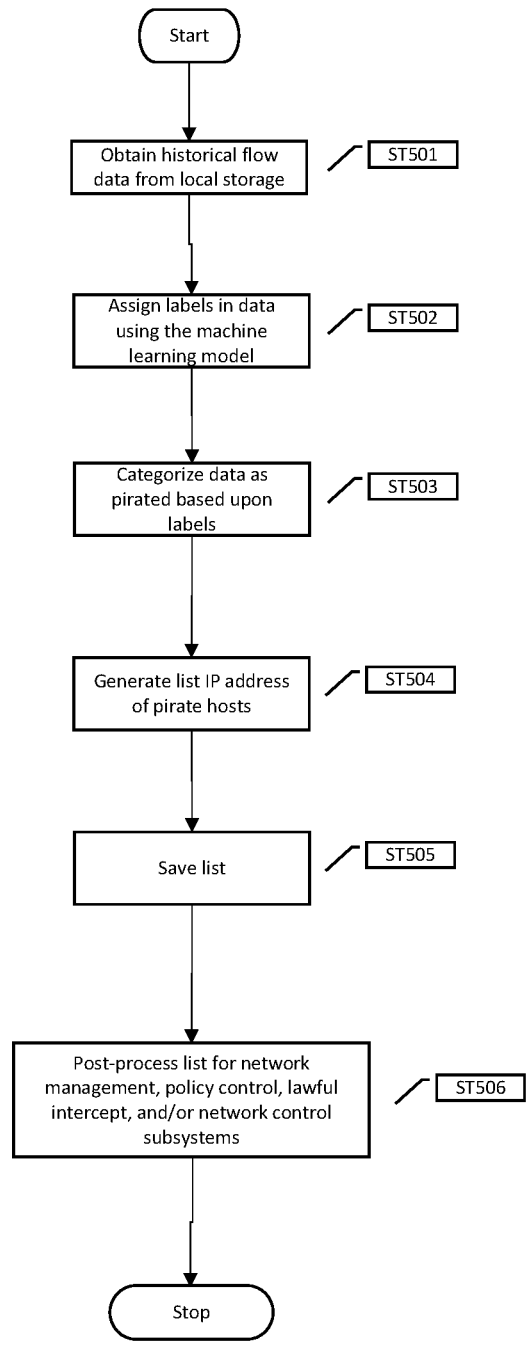
FIG. 5 shows a flow chart according to aspects of the invention for the operation of the invention when operating in the offline or historical data mode.

FIG. 5 shows the flow chart for steps taken to analyze historical flow data. Historical flow data is processed in batch mode. Step (ST501) is to import the flow data by reading the flow data record file into the memory of the system for the machine learning model (109) to analyze in step (ST502). The machine learning (109) in step (ST502) analyzes the data and labels the flow records with the statistical probability of it being a pirated video. The next step, (ST503) is to further categorize the labeled flow records by selecting only the records where the labeled probability is greater than a configured value. In step (ST504), the categorized flow records are transformed into a list of IP addresses for pirate hosts then saved to the results repository (110) in step (ST505). In step (ST506), the categorized results in the results repository (110) are ready for post processing.

Figure 4:
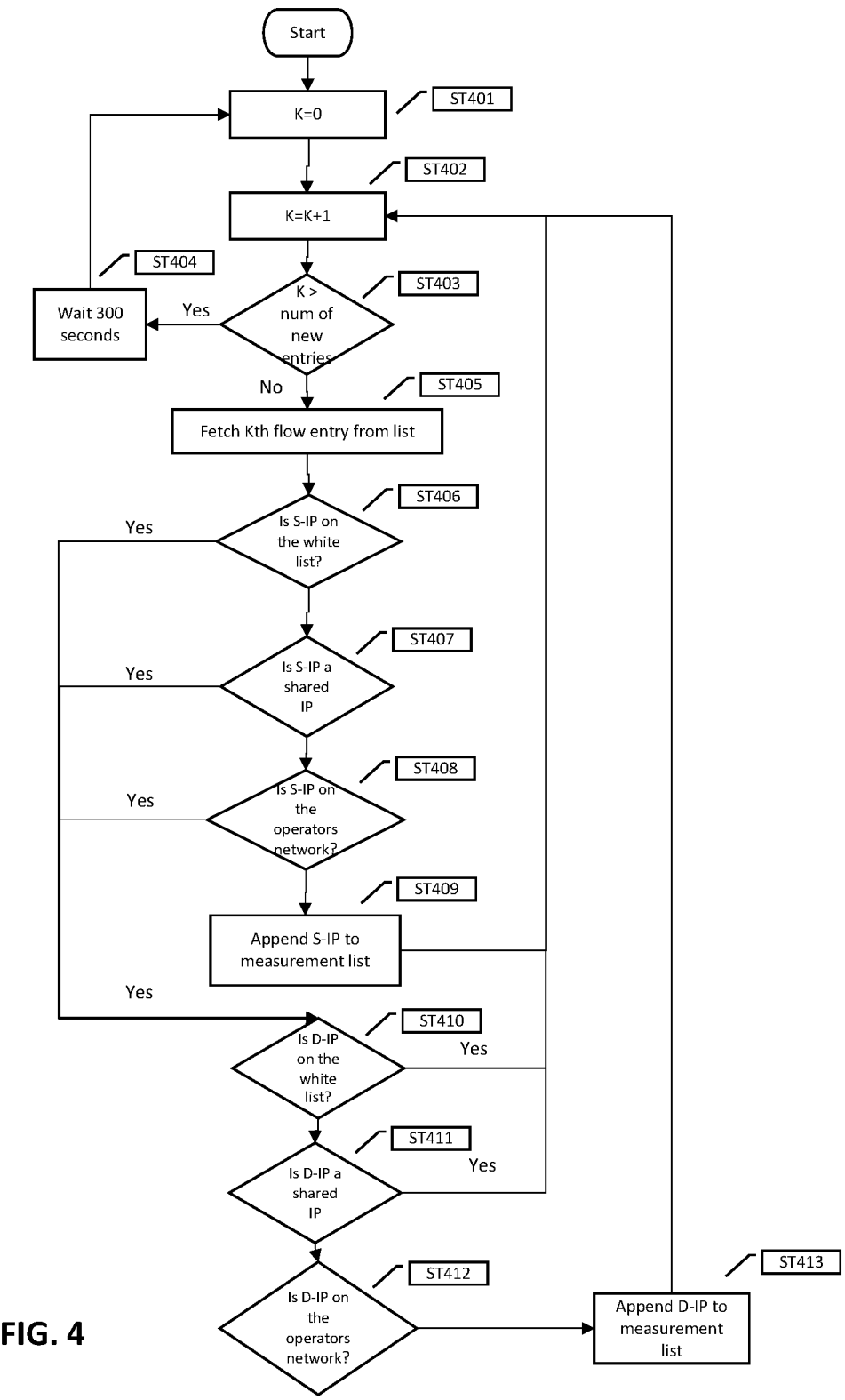
FIG. 4 shows a method flow chart according to aspects of the invention for the method to transform the output from the machine learning model, a categorized flow data set, to an IP address list.

FIG. 4 shows the flow chart for the steps taken to transform the categorized results from the machine learning as described in FIG. 5 and FIG. 6. Step (ST401) is to initiate a counter, k, at 0. Step (ST402) is to increment the counter, k, by 1. The next step (ST403) is to check if k is greater than the number of new categorized entries. If so then wait 300 seconds in step (ST404), otherwise proceed to step (ST405). In step (ST405), the next or Kth entry from the categorized results is obtained. In step (ST406), the source IP address is checked to determine if the source IP address is one the list to permit or whitelist. (e.g. one of the address blocks designated for private networks per the IETF RFC 1918 "Allocations for Private Internets"). If so, then proceed to step (ST410), else continue to step (ST407). In step (ST407), the source IP address is checked to see if it is on the list of IP addresses known to be shared IP address (e.g. part of a content delivery network (CDN, shared host, etc.). If so, then proceed to step (ST410), if it does not belong to a shared IP address then proceed to step (ST408). In step (ST408), if the source IP address is allocated to the network operator's network then proceeds to step (ST410), if not then in step (ST409) append the IP address to the measurement list. In the next set of steps (ST410, ST411, ST412), the destination IP address is checked to see if it is on the whitelist, a shared IP address, or is part of the network operator's network (123). If the destination address is not on the whitelist, nor a shared IP address, nor allocated to the network operator's network (123) then append the destination IP address to the measurement list in step (ST413). Once both the source and destination IP addresses in the data record have been checked the next step is to repeat this process for all the new categorized results in the results repository (110) by going to step (402).

Figure 9:
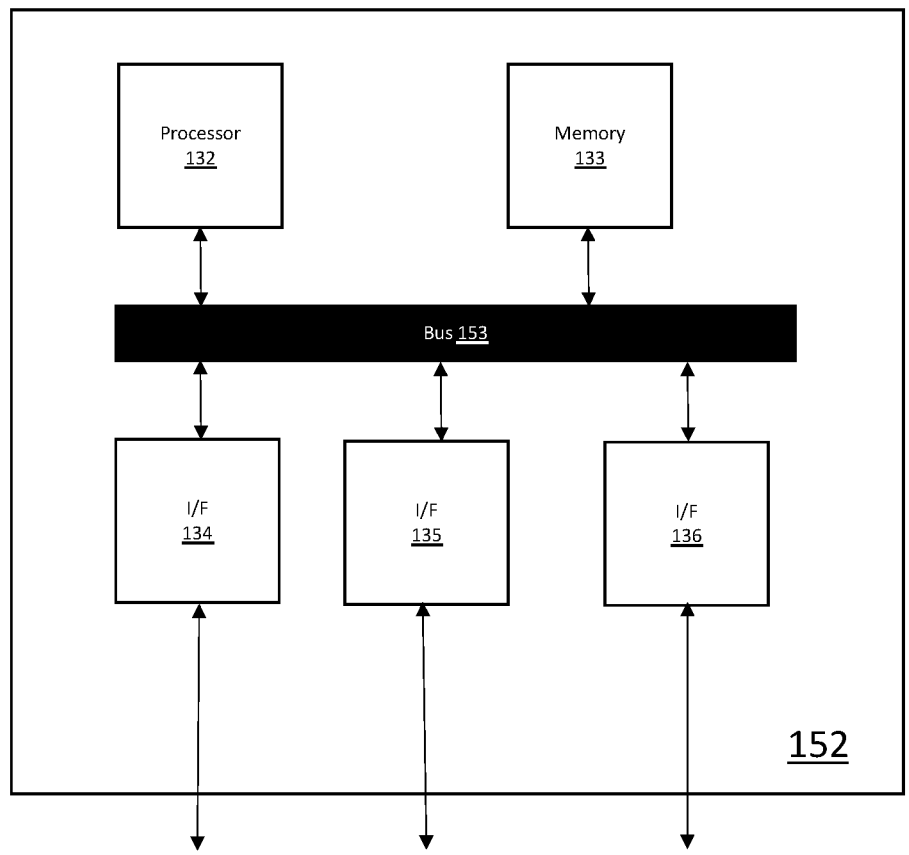
FIG. 9 is a partially schematic block diagram showing the Pirated Video Detection Tool according to at least some embodiments.

FIG. 9 is block diagram showing, in partially schematic form, hardware for the Pirated Video Detection Tool server [PVDT] (152) according to at least some embodiments. The PVDT server includes one or more hardware interfaces (134, 135, 136) that provide physical connections to network over which PVDT server (152) communicates with an IP flow exporter (118), policy enforcement system (119), network measurement system (120), lawful intercept system (121), a network controller (122), other network elements, and/or the network itself (123). In at least some embodiments, hardware interfaces (134, 135, 136) include one or more Ethernet cards. PVDT server (152) further includes memory (133) for storing instructions and data and a processor (132) for executing instructions and controlling operation of a PVDT server. Although a single block is shown for memory (133) and a single block for processor (132), memory and computational operations of PVDT server (152) could respectively be distributed across multiple memory devices and/or across memory and processors located on multiple platforms. Memory (133) may include volatile and non-volatile memory and can include any of various types of storage technology, including any of various types of storage technology, including one or more of the following types of storage devices: read only memory (ROM) modules, random access memory (RAM) modules, magnetic tape, magnetic discs, optical disk, flash memory, and EEPROM memory. Processor (132) may be implemented with any of a numerous type of devices, including but not limited to one or more general purpose microprocessors, one or more application specific integrated circuits, one or more field programmable gate arrays, and a combination thereof. In at least some embodiments, processor (132) carries out operation described in herein according to machine readable instructions stored in memory (133) and/or stored in hardwired logic gates with processor (133). Processor communicates with and controls memory (133) and interfaces over one or more buses (153).

Figure 7:
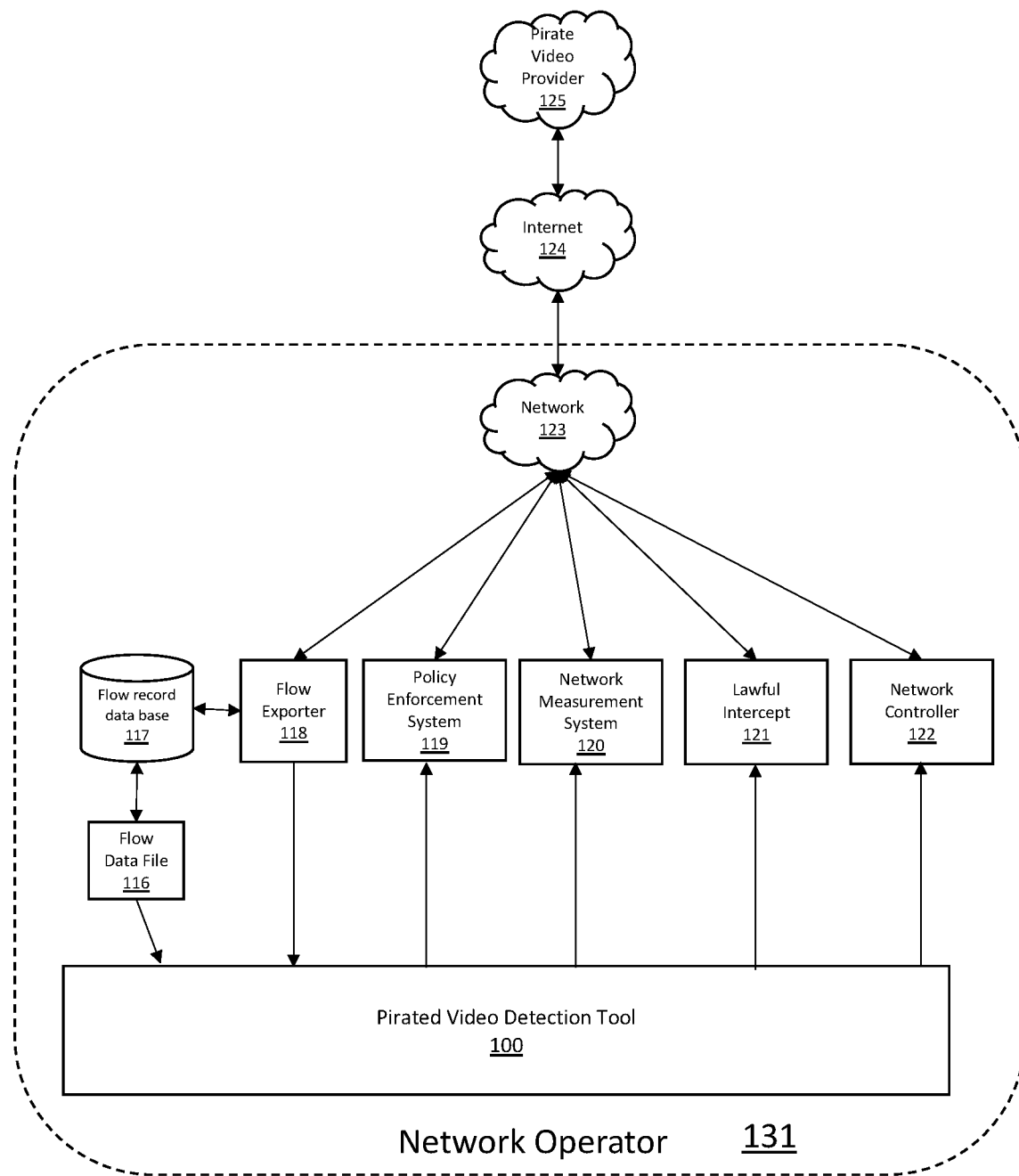
FIG. 7 shows a block diagram of an embodiment implementing the present invention as part of the network operators network infrastructure

FIG. 7 is a block diagram showing, in partial schematic form, for the PVDT (100) according to at least some embodiments of the PVDT (100) deployed as computing element on the network operator's network (123).

Figure 8:
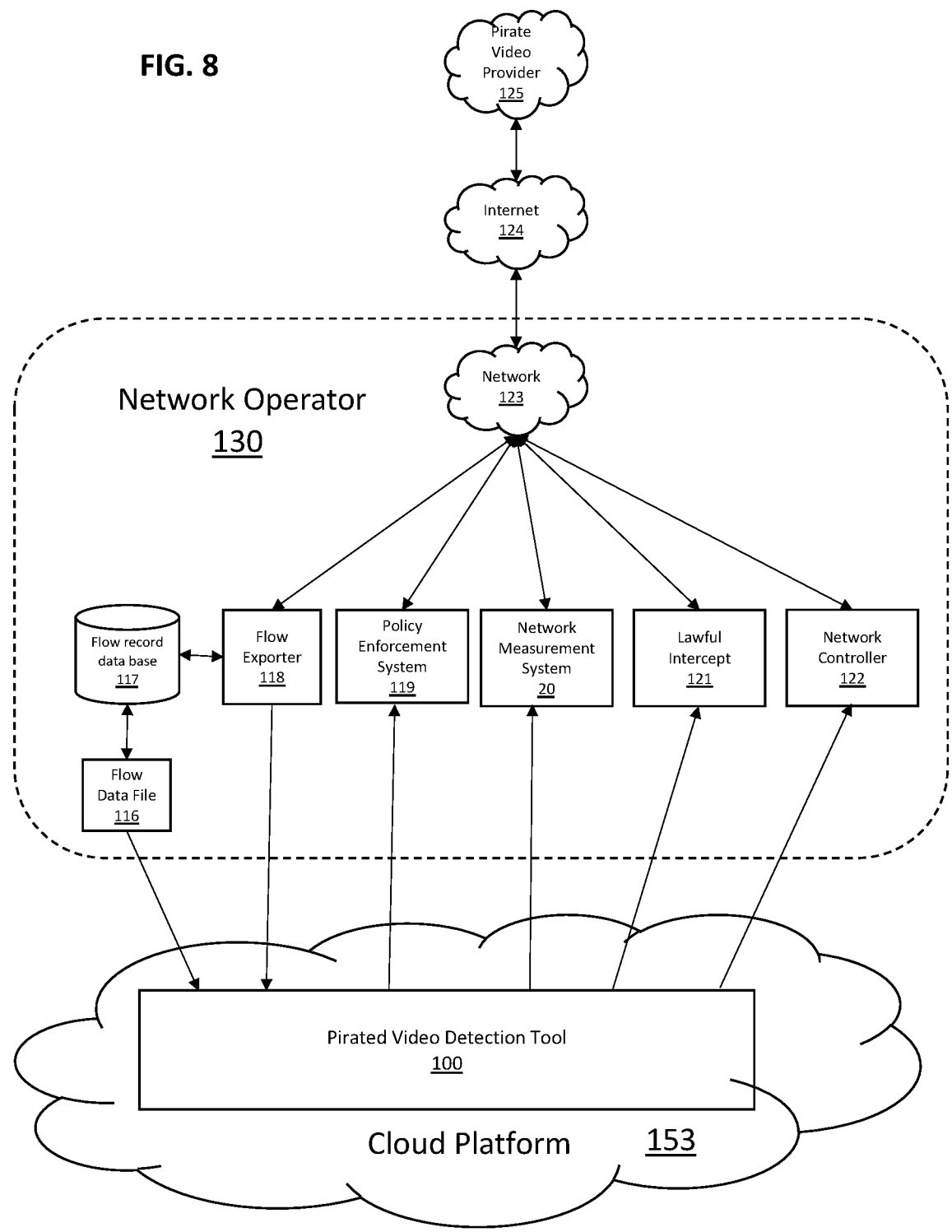
FIG. 8 shows a block diagram of an embodiment implementing the present invention remote of the network operator's network on a cloud platform

FIG. 8 is a block diagram showing, in partial schematic form, for the PVDT(100) according to at least some embodiments of the PVDT tool deployed on a cloud platform (153) and integrated to receive data from a network operator (130) and send commands back to the network operator (130) using one more interfaces. A cloud platform (153) is a cloud computing system that provides on demand computer system resources—data storage and computing power—without direct active management by the user. The computer system resources are physically in data centers connected to the internet. The cloud platform (153) can be either a public or private cloud.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What we claim are:

1. A method for detection and identification of pirated video traffic in a network, comprising:
    obtaining non-pirate video network flow data, the non-pirate sourced data comprising a first plurality of non-pirate network flow data;
    obtaining a pirate video network flow data set, the pirate video network flow data set comprising of a second plurality of pirate video network flow data, and a second label categorizing said corresponding network flow data associated with pirated video traffic;
    analyzing by a processor of a computer and using a machine learning algorithm, the non-pirate video network flow data and the pirate video network flow data set to generate a machine learning model;
    obtaining historical or real-time flow data from a network, the historical or real-time flow data comprising a third plurality of data units;
    applying the third plurality of flow data as the input to the machine learning model to output a statistical predication of the plurality of labels assigned to a second data unit of the third plurality of network flow data;
    categorizing the second data unit as associated with pirated video based upon the statistical prediction; and
    transforming the categorized second data unit into a list of IP addresses of both the source and destination of pirate video traffic on the network.

2. The method of claim 1, further comprising:
    wherein obtaining the pirated video network flow set by analyzing packet captures of video player clients communicating with pirated video provider for unique flows.

3. The method of claim 1, further comprising:
    wherein generating a classifier for the machine learning model using as input to the machine learning algorithm the packet inter-arrival time statistic per flow, packet size statistics per flow, packet source and destination ports for the flow, and the payload data of the first packet in the flow.

4. The method of claim 1, further comprising:
using a plurality of classifiers for the machine learning model to output a statistical prediction of the plurality of labels assigned to a second data unit of the third plurality of network flow data.

5. The method of claim 1, further comprising:
continually updating the ground truth data set to re-train, the machine learning model.

6. The method of claim 1, further comprising:
continually updating the classifiers used by the machine model by analyzing with a computer and using a machine learning algorithm of packet flow data, the non-pirate video network flow data and pirated video network flow data to generate classifiers for the machine learning model of the packet flow data.

7. A system for detection and identification of pirated video traffic in a network, comprising:
at least one processor; and
at least one memory, wherein at least one of the at least one memory and the at least one processor stores instructions executable by the at least one processor to perform operations comprising functionalities for:
obtaining non-pirate video network flow data, the non-pirate sourced data comprising a first plurality of non-pirate network flow data;
obtaining a pirate video network flow data set, the pirate video network flow data set comprising of a second plurality of pirate video network flow data, and a second label categorizing said corresponding network flow data associated with pirated video traffic;
analyzing by a processor of a computer and using a machine learning algorithm, the non-pirate video network flow data and the pirate video network flow data set to generate a machine learning model;
obtaining historical or real-time flow data from a network, the historical or real-time flow data comprising a third plurality of data units;
applying the third plurality of flow data as the input to the machine learning model to output a statistical predication of the plurality of labels assigned to a second data unit of the third plurality of network flow data;
categorizing the second data unit as associated with pirated video based upon the statistical prediction; and
transforming the categorized second data unit into a list of IP addresses of both the source and destination of pirate video traffic on the network.

8. The system of claim 7, further comprising:
wherein obtaining the pirated video network flow set by analyzing packet captures of video player clients communicating with pirated video provider for unique flows.

9. The system of claim 7, further comprising:
wherein generating a classifier for the machine learning model using as input to the machine learning algorithm the packet inter-arrival time statistic per flow, packet size statistics per flow, packet source and destination ports for the flow, and the payload data of the first packet in the flow.

10. The system of claim 7, further comprising:
using a plurality of classifiers for the machine learning model to output a statistical prediction of the plurality of labels assigned to a second data unit of the third plurality of network flow data.

11. The system of claim 7, further comprising:
continually updating the ground truth data set to re-train, the machine learning model.

12. The system of claim 7, further comprising:
continually updating the classifiers used by the machine model by analyzing with a computer and using a machine learning algorithm of packet flow data, the non-pirate video network flow data and pirated video network flow data to generate classifiers for the machine learning model of the packet flow data.

13. An apparatus for detection and identification of pirated video traffic in a network, comprising:
at least one processor; and
at least one memory, wherein at least one of the at least one memory and the at least one processor stores instructions executable by the at least one processor to perform operations comprising functionalities for:
obtaining non-pirate video network flow data, the non-pirate sourced data comprising a first plurality of non-pirate network flow data;
obtaining a pirate video network flow data set, the pirate video network flow data set comprising of a second plurality of pirate video network flow data, and a second label categorizing said corresponding network flow data associated with pirated video traffic;
analyzing by a processor of a computer and using a machine learning algorithm, the non-pirate video network flow data and the pirate video network flow data set to generate a machine learning model;
obtaining historical or real-time flow data from a network, the historical or real-time flow data comprising a third plurality of data units;
applying the third plurality of flow data as the input to the machine learning model to output a statistical predication of the plurality of labels assigned to a second data unit of the third plurality of network flow data;
categorizing the second data unit as associated with pirated video based upon the statistical prediction; and
transforming the categorized second data unit into a list of IP addresses of both the source and destination of pirate video traffic on the network.

14. The apparatus of claim 13, further comprising:
wherein obtaining the pirated video network flow set by analyzing packet captures of video player clients communicating with pirated video provider for unique flows.

15. The apparatus of claim 13, further comprising:
wherein generating a classifier for the machine learning model using as input to the machine learning algorithm the packet inter-arrival time statistic per flow, packet size statistics per flow, packet source and destination ports for the flow, and the payload data of the first packet in the flow.

16. The apparatus of claim 13, further comprising:
using a plurality of classifiers for the machine learning model to output a statistical prediction of the plurality of labels assigned to a second data unit of the third plurality of network flow data.

17. The apparatus of claim 13, further comprising:
continually updating the ground truth data set to re-train, the machine learning model.

18. The apparatus of claim 13, further comprising:
continually updating the classifiers used by the machine model by analyzing with a computer and using a machine learning algorithm of packet flow data, the non-pirate video network flow data and pirated video network flow data to generate classifiers for the machine learning model of the packet flow data.

* * * * *